United States Patent [19]

Mayer et al.

[11] Patent Number: 4,927,203
[45] Date of Patent: May 22, 1990

[54] BOOT SEALING AND ATTACHMENT MEANS FOR AUTOMOTIVE DOOR LOCK ACTUATORS AND THE LIKE

[75] Inventors: Ronald F. Mayer, Northville; Robert Thrasher, Jr., Taylor, both of Mich.

[73] Assignee: United Technologies Electro Systems, Inc., Columbus, Miss.

[21] Appl. No.: 312,087

[22] Filed: Feb. 17, 1989

[51] Int. Cl.[5] .............................................. E05B 47/00
[52] U.S. Cl. .................................. 292/201; 292/336.3; 74/18; 74/566
[58] Field of Search ...................... 292/201, 144, 336.3; 74/612, 566, 18; 29/400 C, 454

[56] References Cited

U.S. PATENT DOCUMENTS

| | | | |
|---|---|---|---|
| 2,397,882 | 4/1946 | Paxman | 74/18 X |
| 4,131,306 | 12/1978 | Sokoly et al. | 292/201 |
| 4,269,440 | 5/1981 | Gelhard | 292/201 X |
| 4,522,081 | 6/1985 | Mackin et al. | 74/566 X |

Primary Examiner—Richard E. Moore

[57] ABSTRACT

An improved sealing and attachment means between a rubber boot (20) for a powdered door lock (4) and its actuator rod (10), which allows, not only radial, linear movement of the rod with respect to its power motor, but also rotational movement of the rod within its attachment to the boot, allowing such rotation without significantly distorting the boot. Two, axially spaced grooves (13 & 14) are located on the exterior surface of the rod at the area (15) to which the boot is to be attached, while two longitudinally spaced annular beads (22 & 23) are provided on the interior surface of the end portion (21) of the boot, which beads will be located between, but not in, the grooves. Two ring clips (16 & 17), serving as radially extended retainers, are placed in the rod grooves, fixedly positioning the attachment end portion of the boot longitudinally between the grooves. A gap (18) allows the ring clip to be laterally clipped onto its respective groove. A non-liquid lubricant is preferably included within the interior pocket (24) defined by the interior surface of the boot end between the beads and the confined exterior surface (15) of the rod between the grooves and the beads. During rotation, the curved, distal tips of the beads move around the smooth, cylindrical surface of the rod, preventing any distortion of the boot during such rotation, while maintaining a water-tight seal with the rod.

14 Claims, 3 Drawing Sheets

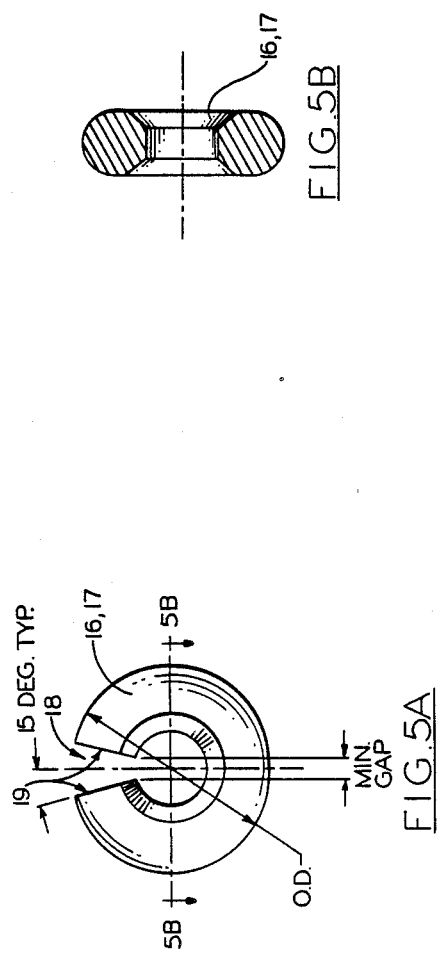
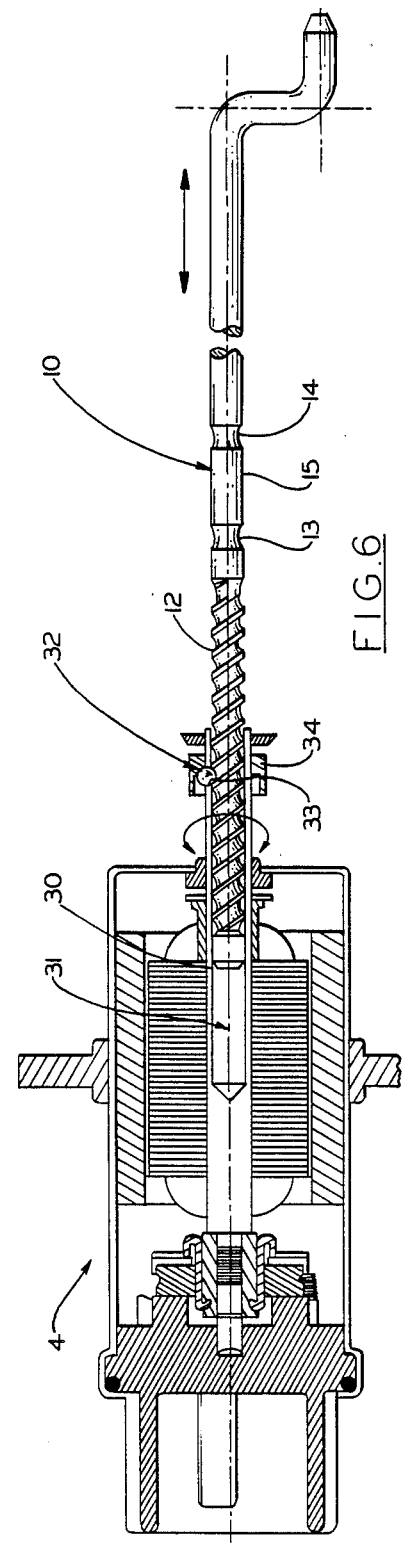

BOOT SEALING AND ATTACHMENT MEANS FOR AUTOMOTIVE DOOR LOCK ACTUATORS AND THE LIKE

TECHNICAL FIELD

This invention relates to boot sealing and attachment means, wherein a flexible boot, typically made of rubber, is used to at least partially cover over and protect an electric motor, and is attached and sealed to an actuator rod capable of both axial as well as rotational movement, which rod is driven by the motor. More particularly the present invention in its preferred embodiment is directed to such a sealing and attachment means for an automotive powered door lock actuator, in which the boot serves to seal off and protect the electric motor located within the boot, which motor drives the door latching mechanism through the axially, linearly moveable and rotatable actuator rod.

BACKGROUND ART

Power door lock actuators are becoming a popular accessory for automobiles. Because of the increased demand for this type of accessory, automobile manufacturers have endeavored to make this accessory available on a wide range of models.

Such an actuator typically includes an electric motor with an actuator rod for the door latching mechanism, which rod is capable of both axial and rotational movement with respect to the motor. An example of such a door lock actuator is found in U.S. Pat. No. 4,131,306 of Sokoly et al (issued Dec. 26, 1978).

In such an exemplary prior art system a rubber boot is used to seal off and environmentally protect the electric motor for the door lock actuator, which upon an appropriate electrical power signal drives the rod axially in a longitudinal direction inwardly or outwardly with respect to the motor, in order to lock and/or unlock the door latching mechanism. The rod is also capable of rotational motion with respect to the motor.

Typically the upward end of the boot is affixed to the actuator rod. However, with such a fixed connection, when the rod is rotated even a relatively small degree, the boot becomes distorted due to its fixed connection to the rod, and such distortion can impair the integrity of the sealed area between the upward or distal end of the boot and the actuator rod.

This exemplary prior art system is generally illustrated in FIG. 1 hereof.

DISCLOSURE OF INVENTION

It is an object of the present invention to provide boot sealing and attachment means between the boot and the actuator rod which will allow both axial, as well as rotational, movement of the rod without distorting the boot and while maintaining a good water sealing interface between the boot and the rod.

To achieve this objective, the present invention provides in its preferred embodiment two, spaced annular grooves in the rod and a special end tip portion on the boot, which includes two inwardly directly, internal beads or projections, which will bear against and ride around on the cylindrical, outer surface of the rod, as the rod rotates, with the two beads being located between the annular grooves. Two circular clips are positioned in the rod grooves, fixedly locating the end tip portion of the boot in the longitudinal or axial direction between the two spaced grooves. A sealing lubricant is also preferably included within the interior or internal area defined between the two beads and the inner surface of the end tip portion of the boot, and the contained outer surface of the rod between the two beads.

The clips, when located in the grooves, serve as radially extended, retainer members for trapping and longitudinally affixing the distal boot end to the rod.

Such a design allows random rotational positioning of the actuator rod within the rod sealing area of the boot, while maintaining water-tight integrity. The actuator rod end may be rotated to any position and attached to a mechanism without any boot deformation. Additionally a positive, water-tight seal is maintained between the rod and the boot during both the linear and rotational rod movements.

This is in contrast to the previous designs, which utilized a direct sealing interface between the actuator rod and the boot, which previous designs caused boot deformation and increased linear actuation efforts, when rotation of the rod was required for, for example, attaching the rod to a mechanism, such as a door latching mechanism.

It is noted that a good seal around the shaft or rod is necessary, since the actuator of the preferred embodiment is mounted in the door of an automobile or other vehicle, where water and other foreign matter can enter the motor, causing motor failure. Just placing a boot onto the shaft, without providing an adequate sealing interface, diminishes, if not destroys, the environmental seal capabilities provided by the boot for the motor.

BRIEF DESCRIPTION OF DRAWINGS

FIGS. 5A & 5B are end and side, cross-sectional views, respectively (with the latter being taken along section line 5B–5B of the former), of one of the gaped, ring clip retainers used in association with the grooves on the rod to affix the boot to the rod.

FIG. 6 is a cross-sectional, side view of the motor drive portion of the door lock motor and its driving interface with the proximal end portion of the actuator rod, the details of which are of standard design and do not form a part of the invention.

BEST MODE FOR CARRYING OUT THE INVENTION

Figure 1:
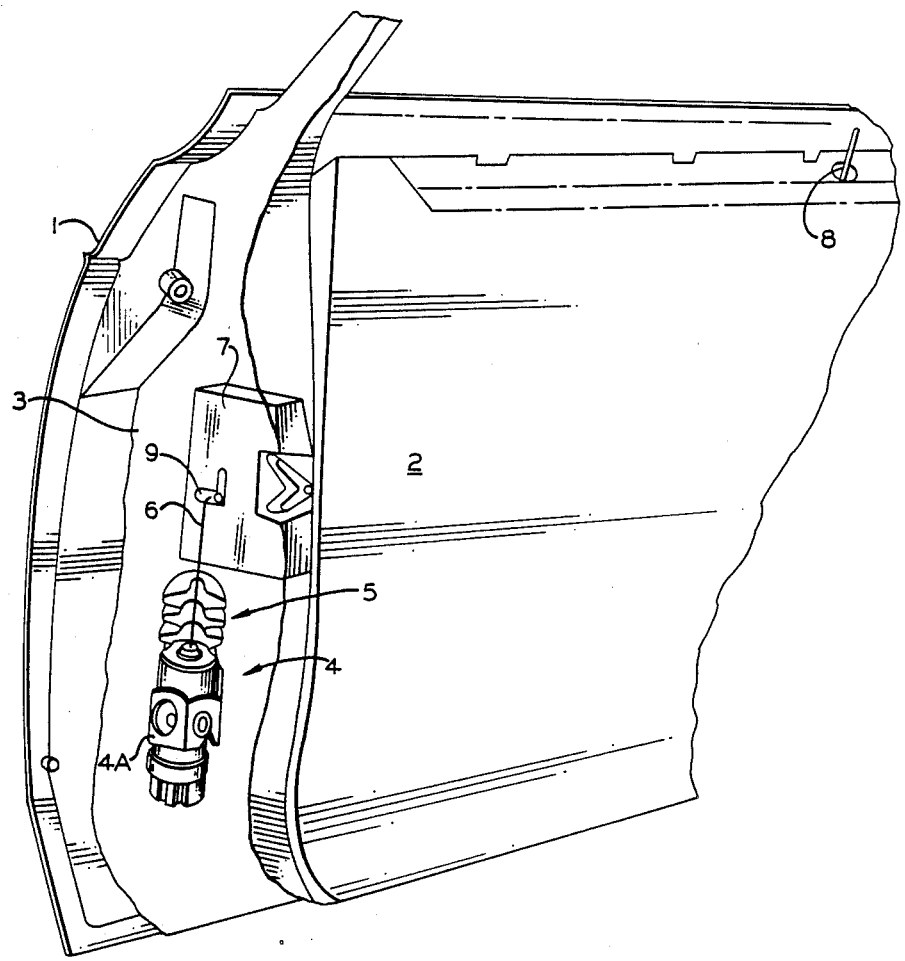
FIG. 1 is a partial, perspective view of an exemplary automotive door, with part of the door cut away to show the general location of an exemplary door lock motor and boot with its actuator rod attached to the door latching mechanism, all in accordance with general "prior art" principles, which provides the exemplary, preferred application of the present invention.

Referring firstly to FIG. 1, there is illustrated an automobile door having an outside, sheet metal surface or panel 1, an inside, trim finish surface or panel 2, and a latch surface 3 located approximately perpendicularly to the outside and inside panel surfaces. In FIG. 1 the latch surface 3 is not shown in any detail, in order to more clearly show the exemplary locations of the door lock actuating components, including the exemplary electric motor 4, a sealing boot 5 and a door lock actuator rod 6.

A suitable mounting bracket 4A is used to mount the motor 4 onto the door ½. As is well known, the boot 5 has an accordion type design, which allows it to flex in and out.

A door latch assembly 7 is secured to the inside of the latch surface 3, so that it engages a corresponding latch bar (not shown for simplicity purposes) on the vehicle body to maintain the door in a closed position. The latch assembly 7 is conventional and, accordingly, is not described here in detail.

As is known, the latch assembly 7 typically includes a locking mechanism (not shown), which can be actuated by two actuation methods. In the first actuation method, manual means in the form of a conventional door lock button 8 is linked to the latch assembly 7, in such a manner that it allows the latch to be operated in an unlocked position and prevents the latch from being operated in a locked position. The linkage between the door lock button 8 and the latch 7 is conventional and has been omitted from the drawings for sake of clarity.

The second means for locking the latch assembly 7 comprises an electrically operated, reversible linear actuator powered by the electric motor 4. The actuator includes the linearly moveable output shaft or rod 6, which is connected to a locking lever 9 situated on the latch assembly 7. When the locking lever 9 is in a first position, the latch assembly 7 is allowed to be operated. However, when the locking lever 9 is placed in a second or locked position, the latch assembly 7 is prevented from being operated.

The actuator can be any type of power operated actuator, which is capable of being mechanically moved as well. An actuator with an internal screw drive is the preferred type of actuator, although other types of actuators may be employed.

The foregoing is standard practice and a known, established system.

IMPROVEMENTS OF INVENTION

Figure 4:
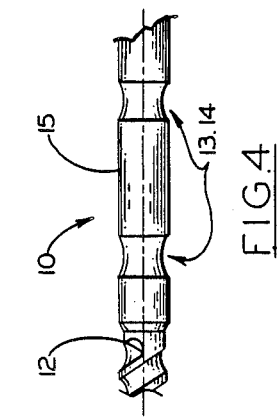
FIG. 4 is a detailed, close-up, side view of the grooved portion of the actuator rod, to which the distal end portion of the boot of FIG. 3 is sealingly attached.
Figure 3:
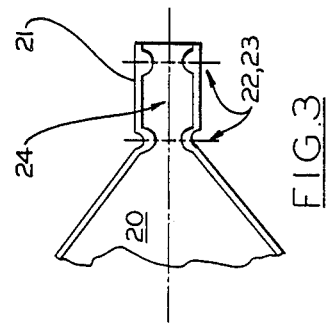
FIG. 3 is a detail, close-up, cross-sectional, side view of the upper, distal, circumferentially reduced, end portion of the boot, showing its interior, beaded structure for its sealing and connecting interface with the actuator rod.

However, in accordance with the present invention, the preferred, exemplary embodiment of the actuator shaft or rod 10 includes two, longitudinally or axially spaced grooves 13, 14 (note FIGS. 4 & 6), to which the end portion 21 of the boot 20 is to be attached. As can be seen in FIG. 3, the end portion 21 of the boot 20 includes on its interior surface two, longitudinally or axially spaced, rounded beads 22, 23 whose rounded, distal tips will ride around on and bear against the smooth, cylindrical surface 15 of the screw shaft or rod 10, when the rod or shaft is rotated. The two beads 22, 23 define between them an annular area or pocket 24, into which a sealing lubricant is placed and held.

Figure 2:
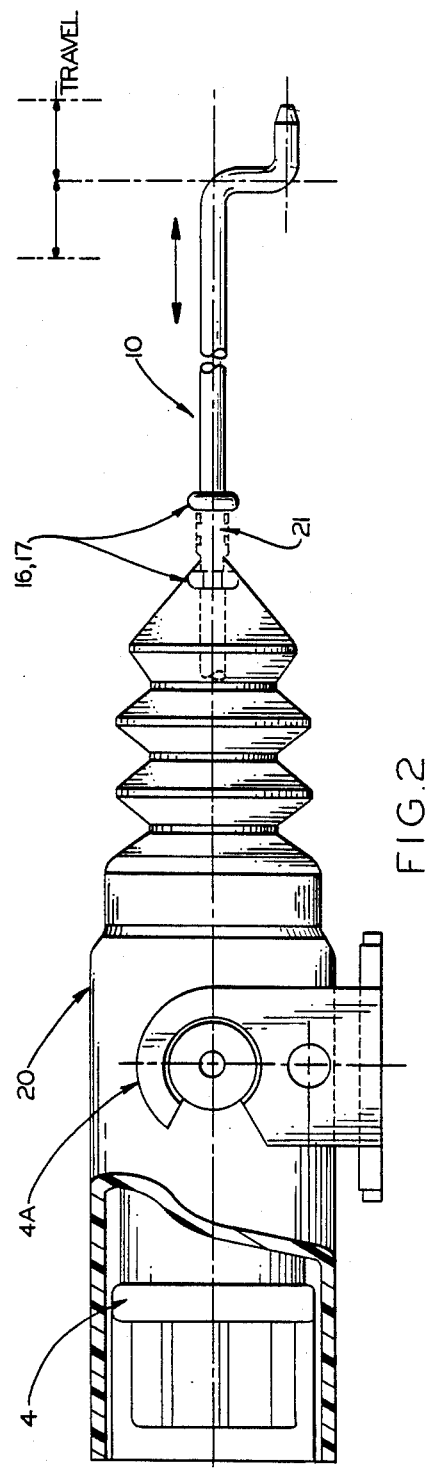
FIG. 2 is a side view of the completely assembled electric door lock motor and boot (with part of the boot cut away), illustrating the boot's sealing attachment to the door lock actuator rod, all in accordance with the principles of the present invention.

As can be seen in FIG. 2, initially a first boot retainer clip 16 is positioned in the inboard rod groove 13, which is the one nearer the motor, and thereafter the end portion 21 of the boot 20 is slid over the distal end of the rod 10 until the bead 22 is positioned against or in juxtaposition to the first ring clip 16.

Thereafter, with the distal end portion 21 of the boot located between the annular grooves 13 & 14, which end portion has a longitudinal length less than the separation distance between the two grooves, the second boot retainer clip 17 is positioned in the annular groove 14 of the actuator rod 10, thus serving to effectively attach the end portion 21 of the boot 20 to the rod in a substantially fixed, axial position. When so affixed, the boot beads 22 & 23 with the sealing lubricant provide a water-tight seal between the distal end 21 of the boot 20 and the rod 10.

Thus, with the two retainer rings 16 & 17 installed and serving as radially extended retainer members, the reduced circumferential area 21 of the boot 20 is nestled and trapped between the two retainers 16 & 17, with the boot being pulled over the inboard or first retainer 16, so that the first retainer is inside the interior boot chamber, which covers over and protect the motor 4. The outer most, distal end tip of the circumferentially reduced area 21 of the boot 20 rests against the outboard or second retainer 17.

This effectively traps the boot 20 on the shaft 10. Furthermore, as previously indicated, the lubricant placed in the area of contact between the boot 20 and shaft 10, not only serves as a lubricant but also enhances the seal between the shaft and the boot. The lubricant in the pocket 24 and the rounded, beaded interface at the beads 22 & 23 allow the shaft 10 to swivel or rotate within the boot interface without distorting the boot 20, thereby preventing any impairment of the integrity of the sealed area which occurred in the prior art designs, while still maintaining a good water-tight seal.

The lubricant, which should have a non-liquid, grease-like consistency, can be applied to the interior of the boot end 21 or it can be applied to the exterior surface of the rod 10, before the boot end is slid over the rod, particularly in the area 16, or both application techniques can be used. After the boot end 21 has been secured over the area 15, the pocket 24 will hold and maintain the non-liquid lubricant in place for long-term lubricating, sealing use. An exemplary lubricant is Dow Corning No. 33.

The retainer clips 16 & 17 have an inner diameter closing matching the diameters of the grooves 13 & 14 and an outer diameter significantly greater than the outer diameter of the rod 10, thus having sufficient radial extent to effectively prevent the distal end portion 21 of the boot 20 from slipping over or past them. To assist in their emplacement in the grooves 13 & 14, the retainer clips 16 & 17 can be made of a strong but somewhat flexible material, such as "Nylon", in the form of an almost closed ring, extending around, for example, about three hundred and thirty (330°) degrees of a circle.

As can be seen in FIG. 5A, a gap 18 is formed in the nearly closed, somewhat flexible ring and includes diverging walls 19 having a greater spacing between them at the outer diameter ("O.D.") of the ring than at the inner diameter (forming a "MIN. GAP") of the ring, allowing the ring clip 16/17 to be affixed to its respective groove 13/14 by forcing the groove radially through the gap. This allows them to be laterally or radially pushed on and clipped about the grooves 13 & 14.

The shaft 10 is free to move axially (and coincidentally rotationally), as it is driven back and forth by the rotating motor armature's interconnection with the shaft or rod 10 via three balls 32 that connects the armature 30 to the rod, as can be seen in FIG. 6. As illustrated in FIG. 6, the shaft 10 extends back into a hollow or tubular section 31 of the armature 30.

The three balls 32, one of which can be seen in the cross-sectional view of FIG. 6, are equally positioned around the shaft 10 and held in position by holes 33 in the tubular section 31 of the armature 30, a cup shaped retainer 34, and the threaded area 12 of the shaft or rod 10 itself.

These details of the motor/rod 4/10 driving interconnection are standard and are not part of the present invention, but are provided for general background information.

The shaft 10 also is free to move rotationally to assure alignment with the lock mechanisms to which it is attached to actuate the door lock when the power lock motor is energized.

With respect to the assembly of the elements of the invention, it is preferred to provide the inboard retainer member 16 first on the rod 10, with the distal end portion 21 of the boot then slid onto the rod, and the second retainer member then applied. This is particularly so for the powered door lock assembly illustrated, which has the rod already attached to the motor 4 before the boot 20 is attached. However, it is possible to redesign the elements, so that the outboard retainer 17 is applied first, with the boot end 21 then slipped over onto the rod at its motor end, and the inboard retainer 16 then applied.

Additionally, although the groove/ring clip combinations 13/16 & 14/17 provide a reliable, economical, easily assembled attachment system, it is possible to provide the axially extended retainer members in other forms. For example, particularly for the first applied retainer, the retainer member could be provided in the form of an integral, increased diameter portion of the rod during the lathing of the rod, or, for further example, radial projection(s) could be welded or otherwise affixed to the exterior surface of the rod.

The foregoing are only exemplary variations or modifications, and many others are, of course, feasible.

Thus, although this invention has been shown and described with respect to a detailed, exemplary embodiment thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

1. In a vehicular electric door locking apparatus, including
   a door locking mechanism movable between locked and unlocked positions,
   reversible, manually operated drive means connected to the locking mechanism for moving it between the locked and unlocked positions,
   non-yielding manual means connected to the locking mechanism for moving it between the locked and unlocked positions,
   electrically powered operated drive means,
   a flexible boot covering over at least in part the electrically powered operated drive means to protect it from the environment, and
   an axially moveable actuator rod connected to the locking mechanism for actuating it when driven by the electrically powered operated drive means and connected to one end of the boot, the improvement which comprises:
   two, radially spaced, annular grooves located around the exterior surface of said rod;
   the distal end portion of said boot including on its interior surface two, longitudinally spaced beads spaced at a distance less than the distance separating said two annular grooves; and
   two boot retainer clips, a first one located within the interior chamber defined by said boot and a first one of said annular grooves, the second boot retainer clip being located outside of but adjacent to said boot adjacent to said second one of said beads and positioned in the second one of said annular grooves; said boot and said rod being attached together with said distal end portion of said boot being substantially affixed to said rod with respect to their relative axially positions but allowing said rod to be rotated within said distal end portion, with the beads bearing inwardly against and sliding around the exterior surface of said rod, without significantly distorting said boot.

2. The improvement of claim 1, wherein there is further included:
   a non-liquid lubricant located within a pocket area defined between said two spaced beads, the interior surface of said end portion of said boot between said beads and the exterior surface of said rod between said beads.

3. The improvement of claim 1, wherein each of said retainer clips comprises:
   a nearly closed ring having an inner diameter comparable to that of its respective groove and an outer diameter significantly greater than the outer diameter of said rod.

4. The improvement of claim 3, wherein said nearly closed ring encompasses about three hundred and thirty degrees of a circle and has some flex to it, and wherein the gap formed by said nearly closed ring includes diverging walls having a greater spacing between them at the outer diameter of the ring than at the inner diameter of the ring, allowing the ring clip to be affixed to its respective groove by forcing the groove radially through the gap.

5. A method for improving, in association with an electric motor, the water-tight interconnection between
   an axially moveable and rotatable actuator rod connected to and linearly driven by the motor,
   a flexible boot, covering the electric motor within an interior chamber defined by the boot and being interconnected with the rod, in which interconnection a distal, reduced circumferential end portion of the boot is connected to the rod,
   comprising the following step(s):
   (a) providing at least a first radially extended member on the exterior surface of the rod, and providing on the interior surface of the distal end portion of the boot at least one inwardly, radially directed bead;
   (b) sliding and positioning the distal, reduced circumferential end portion of the boot onto the rod with one of its ends being located adjacent to the first, radially extended, retainer member; and
   (c) affixing a second, radially extended, retainer member onto the rod in juxtaposition to the other end of the distal end of the boot, the retainer members being spaced at a distance no less than the length of the end portion of the boot in the longitudinal direction, one of the retainer members being located within the interior chamber defined by the boot and the other one being located outside of but adjacent to the distal end of the boot, the boot and the rod being attached together with the distal end portion of the boot being substantially affixed to the rod with respect to their relative axially positions by being trapped between the two retainer members but allowing the rod to be rotated within the distal end portion with the innermost tip(s) of the bead(s) bearing against the exterior surface of the rod without significantly distorting the boot.

6. The method of claim 5, wherein in step "a" there is included the step of:

providing on the interior surface of the distal end portion of the boot two inwardly, radially directed beads longitudinally separated from each other a distance less than the distance between the two retainer members; and wherein there is included the further step of:

adding a non-liquid lubricant into a pocket area formed between the two spaced beads, the interior surface of the distal end portion of the boot between the beads and the exterior surface of the rod shaft between the beads.

7. The method of claim 5, wherein in step "a" there is included the step(s) of:

providing on the exterior surface of the rod at least one annular groove and at least one ring clip which will fit in and be held by the groove, the groove/clip combination serving as the second radially extended member for affixing the boot end portion to the rod in step "c".

8. The method of claim 7, wherein in step "a" there is included the step(s) of:

providing on the exterior surface of the rod two, longitudinally spaced annular grooves and two ring clips which will fit in and be held by the grooves, the two groove/clip combinations serving as the first radially extended member in step "a" and the second radially extended member for affixing the boot end portion to the rod in step "c".

9. The method of claim 7, wherein in step "a" there is included the step(s) of:

providing on the interior surface of the distal end portion of the boot two inwardly, radially directed beads longitudinally separated from each other a distance less than the distance between the two retainer members; and wherein there is included the further step of:

adding a non-liquid lubricant into a pocket area formed between the two spaced beads, the interior surface of the distal end portion of the boot between the beads, and the exterior surface of the rod shaft between the beads, the lubricant serving to assist the relative rotational movement between the boot end portion and the rod and the water-tight sealing for the interconnection between the boot end portion and the rod.

10. The method of claim 7, wherein in step "c" there is included the step(s) of:

clipping the ring clip to the groove by forcing the groove between a gap in the ring clip, while applying the clip to the rod in a lateral direction.

11. In an electrically powered motorized apparatus, including an electric motor, an axially moveable and rotatable actuator rod connected to and linearly driven by the motor, a flexible boot, covering the electric motor within an interior chamber defined by the boot and being interconnected with the rod, in which interconnection a distal, reduced circumferential end portion of the boot is connected to the rod, the improvement which comprises:

a first radially extended member on the exterior surface of the rod, and at least one inwardly, radially directed bead on the interior surface of the distal end portion of the boot;

the distal, reduced circumferential end portion of the boot being positioned on the rod with one of its ends being located adjacent to the first, radially extended, retainer member and with its bead(s) bearing inwardly against the exterior surface of the rod;

a second, radially extended, retainer member affixed to the rod in juxtaposition to the other end of the distal end of the boot, said retainer members being spaced at a distance no less than the length of the end portion of the boot in the longitudinal direction, one of said retainer members being located within the interior chamber defined by the boot and the other one being located outside of but adjacent to the distal end of the boot, the boot and the rod being attached together with the distal end portion of the boot being substantially affixed to the rod with respect to their relative axially positions by being trapped between said two retainer members but allowing the rod to be rotated within the distal end portion with the innermost tip(s) of the bead(s) bearing against the exterior surface of the rod without significantly distorting the boot.

12. The improvement of claim 11, wherein the interior surface of the distal end portion of the boot includes:

two inwardly, radially directed beads longitudinally separated from each other a distance less than the distance between the two retainer members; and wherein there is further included:

a non-liquid lubricant located in a pocket area formed between said two spaced beads, the interior surface of the distal end portion of the boot between said beads, and the exterior surface of the rod between said beads.

13. The improvement of claim 10, wherein, on the exterior surface of the rod, there is included:

at least one annular groove and at least one ring clip which will fit in and be held by the groove, the groove/clip combination serving as said second radially extended member.

14. The improvement of claim 13, wherein said ring clips comprises:

a nearly closed ring having an inner diameter comparable to that of its respective groove and an outer diameter significantly greater than the outer diameter of said rod.

* * * * *